United States Patent
Moore et al.

(10) Patent No.: US 11,438,524 B2
(45) Date of Patent: Sep. 6, 2022

(54) AUTOMATED RACK IMAGING (71) Applicant: Hewlett Packard Enterprise Development LP, Houston, TX (US)

(72) Inventors: David Moore, Houston, TX (US); Jonathon Hughes, Houston, TX (US); Thomas Wright, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/737,033

(22) Filed: Jan. 8, 2020

(65) Prior Publication Data
US 2021/0211583 A1 Jul. 8, 2021

(51) Int. Cl.
*H04N 5/247* (2006.01)
*H04N 7/18* (2006.01)
*H04N 5/232* (2006.01)
*H04N 5/225* (2006.01)

(52) U.S. Cl.
CPC .......... *H04N 5/247* (2013.01); *H04N 5/2256* (2013.01); *H04N 5/23299* (2018.08); *H04N 7/18* (2013.01)

(58) Field of Classification Search
None
See application file for complete search history.

(56) References Cited

U.S. PATENT DOCUMENTS

| | | | |
|---|---|---|---|
| 7,072,739 B2 | 7/2006 | Bash et al. | |
| 7,860,301 B2 | 12/2010 | Se et al. | |
| 8,520,079 B2 | 8/2013 | Schultz et al. | |
| 9,121,805 B2 | 9/2015 | Omura | |
| 9,908,239 B1* | 3/2018 | O'Brien | G05D 1/0282 |
| 2013/0242137 A1* | 9/2013 | Kirkland | G01C 3/12 348/371 |
| 2018/0108120 A1* | 4/2018 | Venable | G06T 3/4038 |
| 2019/0034864 A1* | 1/2019 | Skaff | G06K 7/1413 |

FOREIGN PATENT DOCUMENTS

KR  1020170120815 A  * 11/2017  ..........  G06F 11/3089

* cited by examiner

*Primary Examiner* — Heather R Jones
(74) *Attorney, Agent, or Firm* — Hewlett Packard Enterprise Patent Department (57) ABSTRACT

Example implementations relate to automated rack imaging. According to an example, a system for imaging a face of a rack includes a camera and lighting array, a positioning system, a computer system and a wheeled platform. The array includes multiple cameras located in a first plane orthogonal to a second plane and each camera has a first field of view in a first axis of the second plane. Collectively, the first fields of view extend from one end of the face to another end of the face. The positioning system is operable to move the array from a starting point to an ending point via multiple intermediate points along an axis in a third plane parallel to the first plane. The computer system (i) causes the cameras to capture images at the starting, intermediate, and ending point; (ii) stitches the captured images together; and (iii) stores the resulting image.

12 Claims, 8 Drawing Sheets

AUTOMATED RACK IMAGING

BACKGROUND

Large computer equipment vendors often build and deliver equipment at rack scale in which Information Technology (IT) equipment (e.g., servers, storage, switches, routers, firewalls, and/or other network and server devices) as well as associated power and cabling are mounted in a rack (a/k/a server rack, system rack, server cabinet, etc.). IT equipment that is designed to be mounted within a rack (e.g., to the mounting rails within a rack) is generally referred to as "rack mount equipment." There are many advantages to using racks and rack mount equipment. For example, rack mounting keeps the equipment evenly spaced and facilitates ventilation. Additionally, the equipment is protected against external impact and is easier to maintain as all the equipment is organized in one place. Furthermore, pre-configuration of rack mounted computing equipment also allows for: (i) consistent installation of equipment and connecting cables for uniform appearance and optimized serviceability; (ii) simplified customer ordering process with no need to procure individual auxiliary components (e.g., cables, power infrastructure, networking, etc.); (iii) diagnostic testing of assembled rack solution; and (iv) significantly reduced installation logistics.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to systems and methods for automating rack imaging. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

Many rack scale projects require interactive communications among production locations, designers, builders, supply chain engineers, consulting services, global suppliers and/or customers to facilitate engineering decisions and ensure fulfilment of design intent. Many of such communication involve ad hoc exchange of images and/or videos of a portion of a rack face; however, such images (typically captured by handheld cameras or smartphones) often have one or more deficiencies. For example, the images created for such ad hoc exchanges may be inconsistent (in terms of perspective, distance, and/or content captured), be out of focus, be lacking in detail, suffer from poor lighting, have poor exposure, and the like. Additionally, this type of imaging is labor intensive, insecure, and prone to confusion. As such, it would be desirable to have a more standardized mechanism and process for capturing visual documentation of rack mounted equipment to facilitate numerous use cases, including engineering and business communications, equipment build documentation, customer communications (e.g., customer deliverable production reports), virtual audit, quality control, proof of condition of the equipment as shipped, etc.

Embodiments described herein seek to address various of the above shortcomings by providing an integrated rack imaging system that facilitates accurate and repeatable visual documentation of rack mounted equipment. As described further below, among other things, such documentation may be used in connection with communication between production locations, supply chain engineers, consulting and/or operational services, and customers. Such documentation may also be used to serve as proof of condition of the equipment as shipped. The concept could be licensed or sold.

In one embodiment, a rack imaging system is provided on a mobile platform that is optimized for movement in crowed aisles of a production facility or data center and over obstructions, like cables. The rack imaging system may include a rigid platform or base to which camera and lighting equipment (e.g., one or more camera and lighting arrays) are mounted as well as associated power and compute equipment. In some examples, the mobile platform may be in the form of a two-wheeled hand-truck or a four-wheeled or six-wheeled cart or wagon. Depending upon the particular implementation, the rack imaging system may be configured to facilitate automated one-touch imaging of an entire rack face (or portion thereof). As described further below, in some embodiments, one or more image processing functions may also be performed on the captured rack face image, for example, a real-time comparison of the captured rack face image with representative templates (representing known good rack configurations) or with an average of previously captured rack face images can be performed to provide real-time feedback to the operator regarding potential deviations from the norm.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

A "server rack," a "cabinet rack" or simply a "rack" generally refers to a framework in which IT equipment is mounted. Non-limiting examples of the IT equipment that may be mounted within a rack include servers, storage, switches, routers, firewalls, and/or other network and server devices. In some examples, an industry standard server rack can have a 19" front panel and comes in three standard widths: 19", 23" and 24". Racks come in different configurations. For example, four-post racks provide four vertical mounting rails to support the equipment at the front and rear. These racks may be open in construction without sides or doors, or may be enclosed by front and/or rear doors, side panels, and tops. Most data centers use four-post racks. Two-post racks, which are most often used for telecommunication installations, provide two vertical posts, which are typically heavy gauge metal or extruded aluminum. A top bar and wide foot connect the posts and allow the rack to be security attached to the floor and/or roof for seismic safety. Equipment can be mounted in a two-post rack either close to its center of gravity (to minimize load on its front panel), or via the equipment's front panel holds. Heavy equipment or equipment that is commonly accessed for servicing and for which attaching or detaching at all for corners simultaneously would pose a problem is often not mounted directly onto the rack, but instead is mounted via rails (or slides). For example, a pair of rails may be mounted directly onto the rack, and the equipment then slides into the rack along the rails, which support it. The equipment designed to be placed in a rack is typically describe as rack-mount, rack-mount instrument, a rack-mounted system, a rack-mount chassis, subrack rack-mountable, or occasionally simply shelf. The height of the electronic modules is standardized as multiples of 1.75 inches (or 44.45 mm), which is referred to as one rack unit or "U." While the industry standard rack cabinet is 42 U tall, racks range in size from 18 U to 50 U.

The phrase "wheeled platform" generally refers to a platform having multiple wheels. In various embodiments described herein, a rack imaging system includes a wheeled platform for transporting the rack imaging system within a production facility or data center. The wheeled platform may have two wheels, four wheels or six wheels. Those skilled in the art will appreciate there are numerous types of wheeled platforms. Non-limiting examples of various types of configurations of a wheeled platform that may be used in various embodiments described herein include a hand-truck, a hand cart, a wagon, a lift table, a platform truck, and a dolly trolley.

The phrase "positioning system" generally refers to a mechanical system for moving a camera and lighting array of the rack imaging system vertically and/or horizontally. In various embodiments described herein a rack imaging system includes a manual or automated positioning system that can position a camera and lighting array at various predetermined positions to facilitate capturing of images that include the entire face of a rack. Non-limiting examples of mechanical components that may be used to linearly move a camera and lighting array vertically or horizontally include manual screw jacks, a single or dual-rail linear motion track, electrical linear actuators, a rack and pinion linear slide, a screw or chain drive, a drive belt, hydraulic jacks and/or cylinders, pneumatic actuators, a scissor lift table, and servo motors.

As used herein a "rack face" or simply a "face" generally refers to that which is visible from one of the six sides of a rack. A rack face (e.g., top face, bottom face, front face, back face, left face, and right face) includes the inner surfaces of the side walls any and all equipment, cables and the like that are visible from the perspective of one or more cameras mounted in a plane generally parallel to a plane of the rack face. In some embodiments, an entire rack face is imaged by sequentially capturing images of different regions of the rack face as a camera and lighting array are moved from region to region. In alternative embodiments, a specific portion of interest of the rack face is imaged. In some embodiments, an entire rack face or a specific portion of interest of the rack face is imaged by a two-dimensional camera and lighting array that remains in a fixed position.

Figure 1:
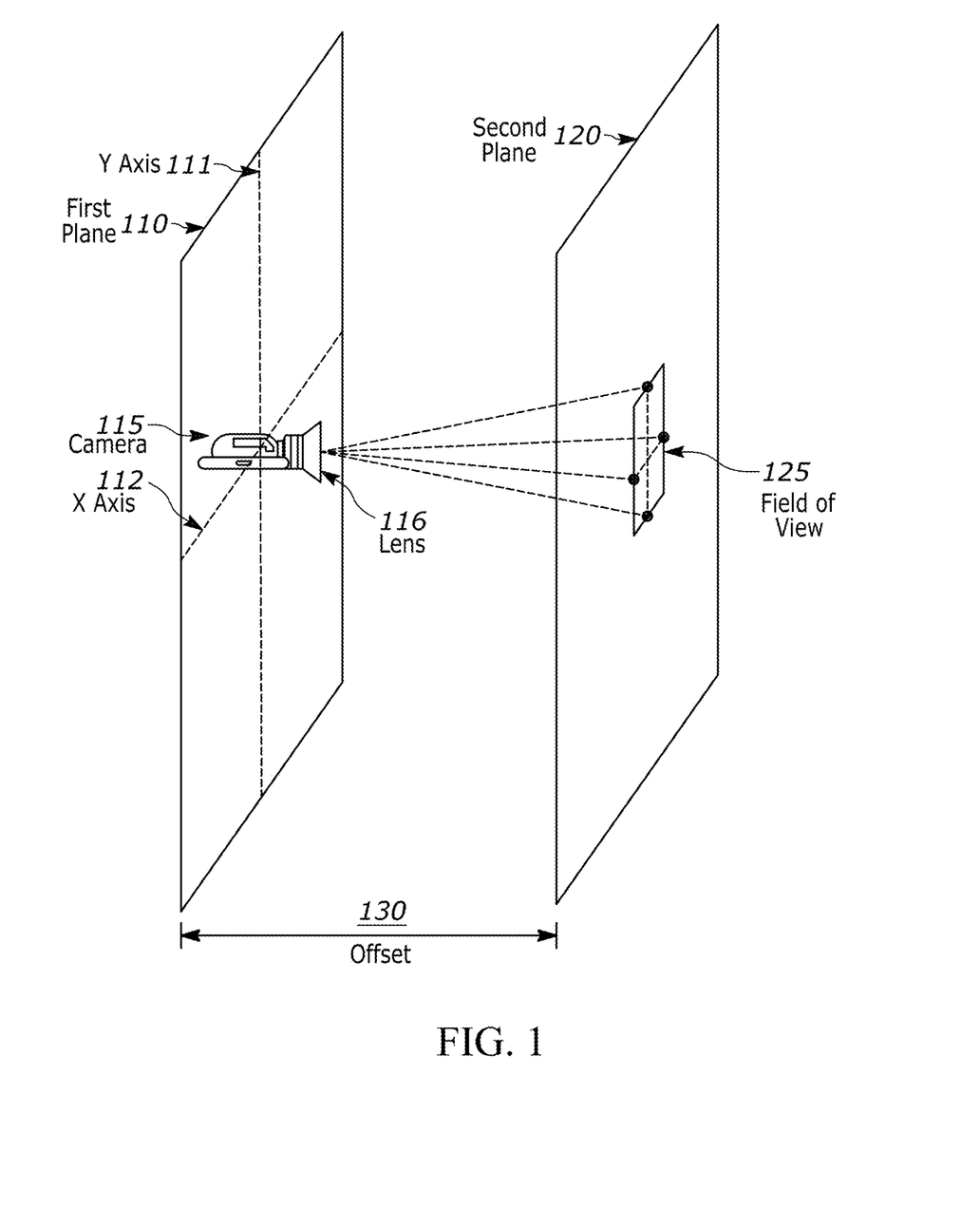
FIG. 1 is a diagram illustrating a field of view of a camera.

FIG. 1 is a diagram illustrating a field of view 125 of a camera 115. Before describing various embodiments of a rack imaging system, some background and context is provided with reference to camera 115 having a lens 116 parallel to a first plane 110. The first plane includes an X axis 112 and a Y axis 111. In various embodiments described herein a camera and lighting array are mounted horizontally or vertically in a first plane (e.g., plane 110) and moved automatically or manually along the axis perpendicular to the axis in which they are mounted to facilitate imaging of an entire face of a rack (represented by a second plane 120 substantially parallel to the first plane 110). At a particular offset 130, camera will have a known field of view 125 having an X component and a Y component in the second plane 120. As such, given the offset 130, the field of view 125 and the dimensions of the rack at issue, a camera array can be positioned at multiple predetermined locations to capture images covering the entire face of the rack.

Figure 2:
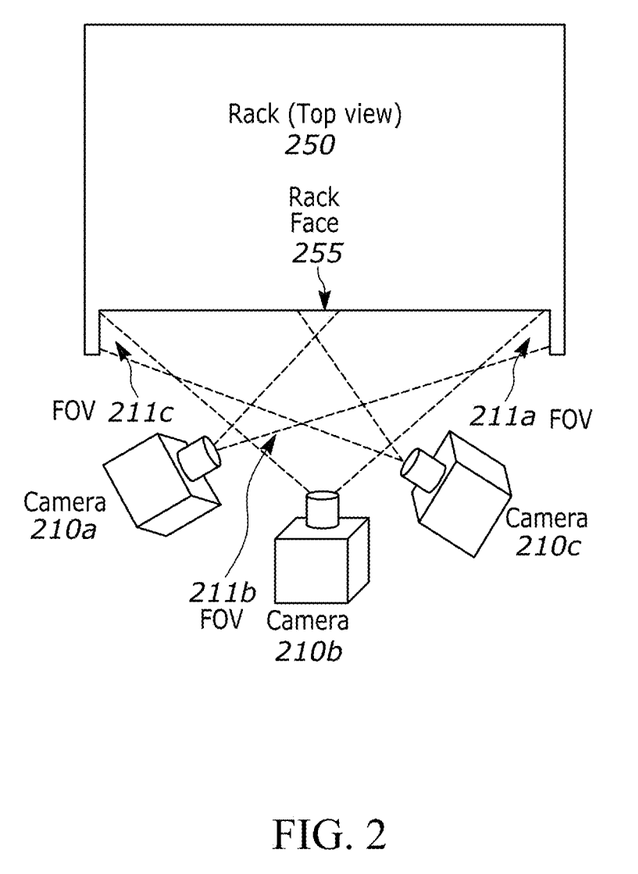
FIG. 2 is a block diagram conceptually illustrating overlapping fields of view of multiple cameras in accordance with an embodiment.

FIG. 2 is a block diagram conceptually illustrating overlapping fields of view 211a-c of multiple cameras 210a-c in accordance with an embodiment. In the context of the present example, a top view of a rack 250 is shown with three cameras 210a-c positioned and oriented with respect to each other so as to have overlapping fields of view 211a-c that collectively cover a face 255 of the rack 250. In this manner, items or equipment mounted on the inner walls of the rack face 255, such as the inner walls, are captured by fields of view 211a and 211c. Non-limiting examples of such items or equipment include cables, power equipment, rack management modules, networking equipment, and cooling infrastructure.

As described above, according to one embodiment, a goal of a rack imaging system is to provide accurate and repeatable visual documentation of rack mounted equipment. In one embodiment, a rack imaging system, having a camera and lighting array including cameras 210a-c, produces an output image, created, for example, by stitching together multiple images taken at each of multiple vertical positions along a Y axis of the rack face 255. In one embodiment, the output image covers the entire rack face 255 from top to bottom and edge to edge. While in the context of various examples described herein the rack face being imaged is associated with an industry standard 42 U rack, those skilled in the art will appreciate the rack imaging system can be designed to accommodate multiple rack implementations and sizes and subranges thereof.

While in the context of the present example three cameras 210a-c are shown and are thought to provide desirable features (e.g., the ability to concurrently image both the rack face and the inner walls of the rack face), more or fewer equally-spaced cameras could be employed depending upon goals of a particular implementation and the horizontal field of view of the cameras at issue. Additionally, while not depicted, in some embodiments, one or more optional video cameras may be employed for capturing video and/or performing real-time collaboration.

Figure 3:
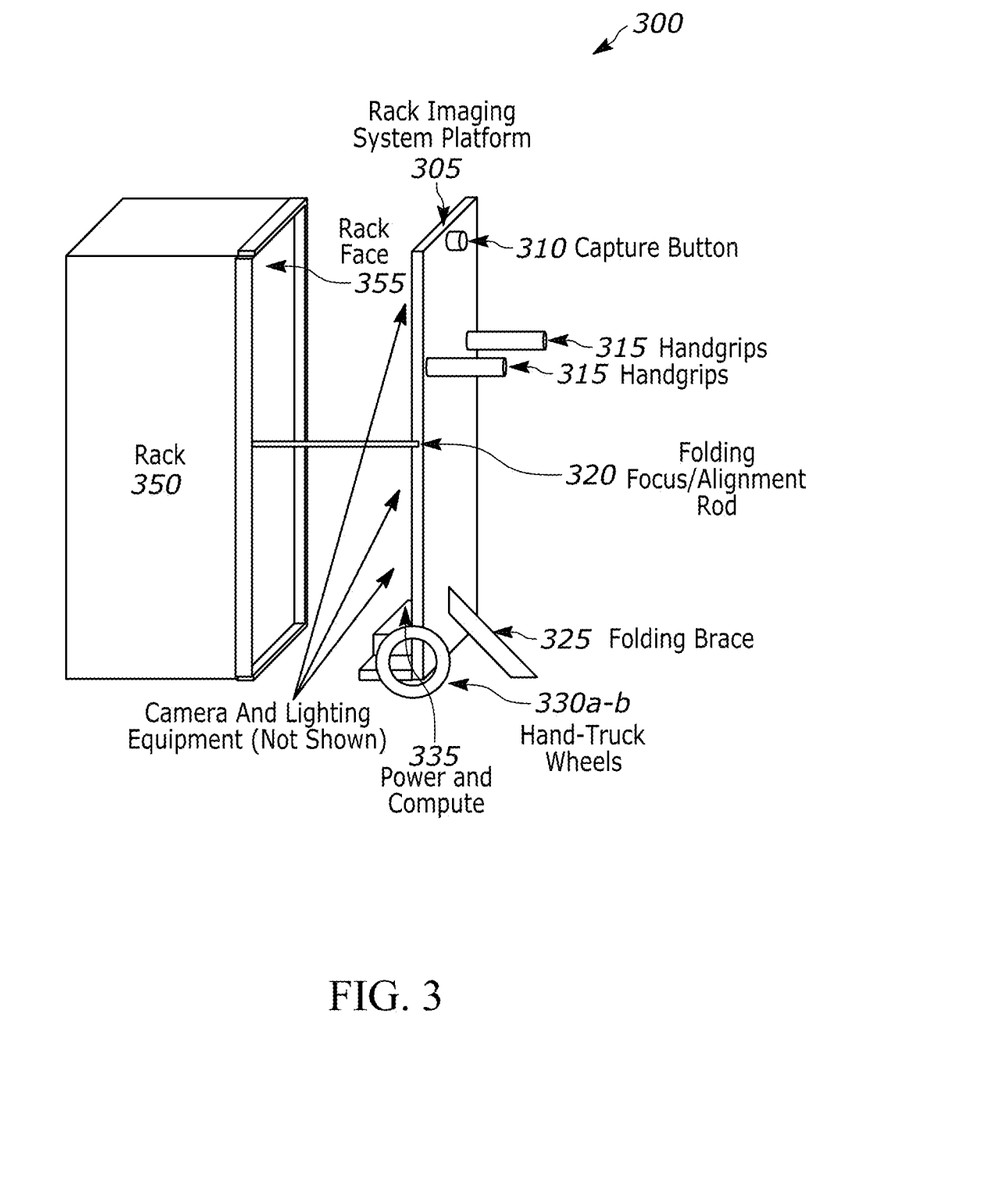
FIG. 3 is a perspective view of a rack imaging system in accordance with an embodiment.

FIG. 3 is a perspective view of a rack imaging system 300 in accordance with an embodiment. Various embodiments of the rack imaging system 300 described herein include a compact mobile platform that can be maneuvered through crowded aisles of a production facility and/or a data center, and over obstructions found in such environments like cables. Depending upon the particular configuration, the rack imaging system 300 may include folding braces and positioning rods to create a stable base and consistently aligned imaging platform.

In the context of the present example, the rack imaging system 300 includes a rack imaging system platform 305 that is part of, integrated with or otherwise mounted to a wheeled platform. In one embodiment, the rack imaging system platform is constructed of rigid material, e.g., steel or aluminum, to support various other components of the rack imaging system 300 thereto. For example, camera and lighting equipment (not shown) may be mounted on the front surface of the rack imaging system platform 305 and a capture button 310, handgrips 315 and a folding brace 325 may be mounted to the rear face of the rack imaging system platform 305.

As an integrated and portable solution, the rack imaging system 300 also includes both power and compute functionality 335. In one embodiment, the compute functionality is provided by an off-the-shelf ruggedized computer system (e.g., a 1 U rugged computer or the like) that is designed to operate reliably in harsh usage environments and conductions, including in the face of shock and vibration, temperature and humidity, and electromagnetic interference. In one embodiment, the power functionality is provided by a portable and rechargeable power supply module that provides a portable alternating current (AC) or direct current (DC) power bank to power the compute functionality.

As described further below, in one embodiment, the rack imaging system 300 may be pre-configured by an end user or an administrator to establish settings for an imaging run and/or facilitate one-touch operation (e.g., capturing of images of a face 355 of a rack 350, stitching together of the various captured images, storage of the resulting image, and one or more other image processing or other operations) via engagement of the capture button 310. In alternative embodiments, the rack imaging system 300 may present a graphical user interface to the end user via a display device (e.g., a touch screen) through which the end user may configure, operate and review results of image processing operations performed by the rack imaging system 300.

In one embodiment, the folding brace 325 is coupled to the rack imaging system platform 305. The folding brace 325 may be in a retracted position during movement of the rack imaging system 300 from one location to another and may be extended (like a kickstand) to provide stability once the rack imaging system 300 is in the desired position in front of the rack face 355 to be imaged.

In one embodiment a folding focus/alignment rod 320 is coupled to the rack imaging system platform 305. Like the folding brace 325, it can be placed in a retracted position during transport. Then, to fine tune positioning of the rack imaging system 300, the folding focus/alignment rod 320 may be engaged/extended to facilitate centering of the rack imaging system 300 with respect to the rack face 355 and create the desired offset between the rack imaging system 300 and the rack face 355 for desired focus and lighting, for example. In alternative embodiments, the focus mechanism may include optical or ultra-sonic measurements and/or make use of an image "edge finding" algorithm. As described further below, downstream image processing performed on the captured images can take advantage of the known positioning and lighting conditions.

The hand-truck wheels 330 should be of sufficient diameter and have sufficient traction to facilitate rolling over obstacles (e.g., cables) expected to be encountered in a production facility. For example, the hand-truck wheels may be 5" to 10" diameter flat free pneumatic wheels made of solid polyurethane foam, solid rubber wheels, or puncture resistant air-filled rubber wheels having sufficient carrying capacity (e.g., between approximately 50 to 400 lbs.).

While in the current example, the rack imaging system 300 is moved to the rack to be imaged, in alterative embodiments, the rack that is to be imaged could be moved to a stationary imaging system. As such, those skilled in the art will appreciate the wheeled platform is optional.

Figure 4:
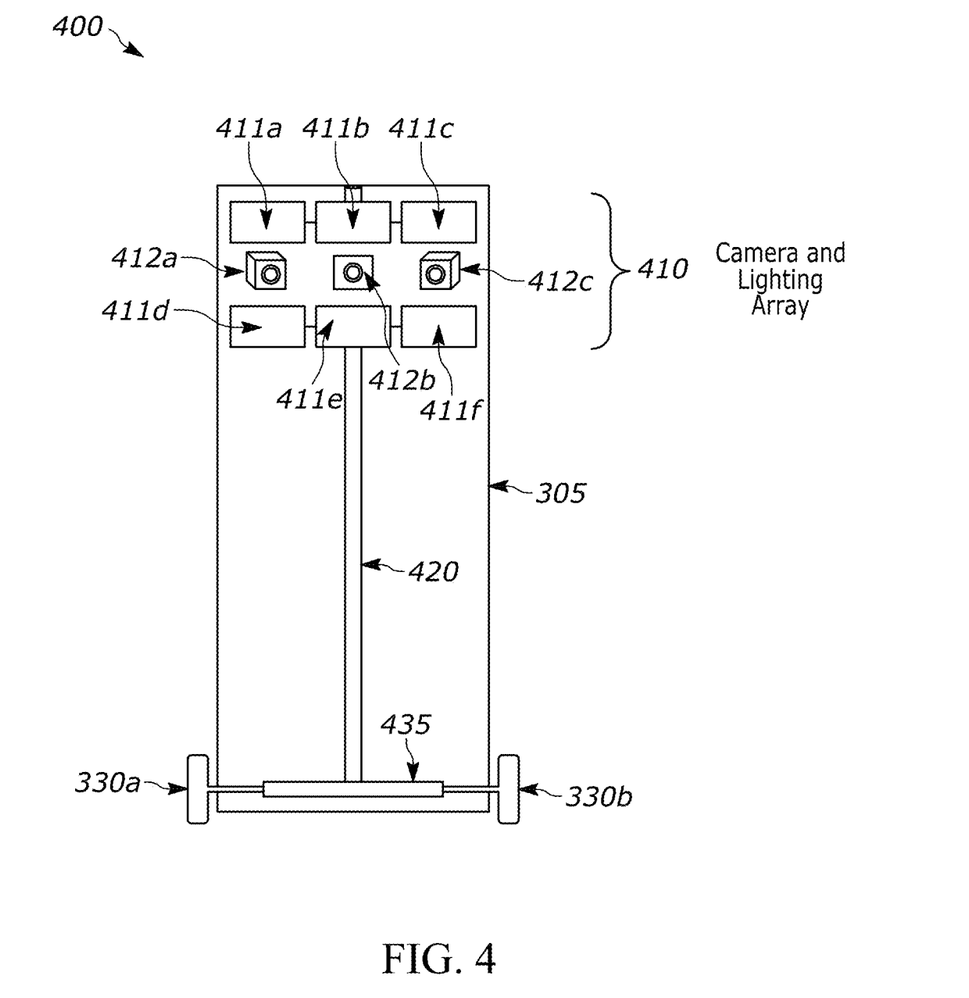
FIG. 4 is a front view of a rack imaging system in accordance with an embodiment.

FIG. 4 is a front view of a rack imaging system 400 in accordance with an embodiment. In the context of the present example, the rack imaging system platform 305 of the rack imaging system 400 may provide a foundation or base for various system components, including a camera and lighting array 410 mounted to a vertical positioning system 420 and the power and compute functionality 335.

In one embodiment the camera and lighting array 410 includes a row of multiple cameras 412a-c mounted within a first horizontal plane with a row of lighting elements 411a-c above and a row of lighting elements 411d-f below each respectively mounted in horizontal planes parallel to the first horizontal plane. Overall, camera selection is dependent upon the goals of a particular implementation, but various considerations include resolution, field of view, depth of field, and cost. According to one embodiment, the cameras 412a-c represent industrial imaging solutions (machine vision) with a universal serial bus (USB), GigE (Ethernet), or Camera Link interface. Non-limiting examples of the types of digital cameras that might be employed include "board cameras" (un-packaged camera modules with mounting provisions for modular lenses), machine vision cameras with mounting provisions for modular lenses, or line scan image sensors with a one dimensional sensor array. For example, cheaper board cameras might make more sense for use in the context of a two-dimensional camera array embodiment, whereas machine vision type cameras might be more suitable for a moving camera and lighting array embodiment.

According to one embodiment, the lighting elements 411a-f provide substantially even lighting with uniform light intensity across the surface and inner side walls of the face of the rack being imaged. Non-limiting examples of a lighting element that may be used for the lighting elements 411a-f include light-emitting diode (LED) arrays with diffusors or LED photo-lighting panels. In one embodiment, the lighting elements 411a-f are approximately 4 to 10 inches wide by approximately 4 to 10 inches high.

While in the context of the present example three cameras 412a-c are shown and are thought to provide desirable features (e.g., the ability to concurrently image both the rack face and the inner walls of the rack face), more or fewer equally-spaced cameras could be employed depending upon goals of a particular implementation and the horizontal field of view of the cameras at issue. Additionally, while not depicted, in some embodiments, one or more optional video cameras may be employed for capturing video and/or performing real-time collaboration. Alternatively, the cameras 412a-c may be capable of both still and video image capture with the same device.

While moving the cameras and the lighting elements together is thought to provide favorable results for each vertical position at which a horizontal region of images are captured, in alternative embodiments, lighting elements may be disposed at fixed positions along the periphery of the surface of the rack imaging system platform 305 with only the cameras being mounted to the vertical positioning system.

While described above in the context of a hand-truck configuration, it is noted the rack imaging system platform 305 or portions thereof may be used with other mobile platforms, such as four or six-wheeled hand cart, wagon, lift table, platform truck or dolly trolley. Alternative positioning systems are also contemplated. For example, as an alternative to the single row of cameras and two rows of lighting elements of camera and lighting array 410 that is moved vertically to capture a sufficient number of regions of images to cover the rack face from top to bottom, a single column of cameras and two columns of lighting elements may be employed that is moved horizontally to capture a sufficient number of regions of images to cover the rack face from edge to edge. As a further alternative, a single camera and lighting array may be positioned vertically with the use of a lift table as the vertical positioning system. A non-limiting example of a mobile lift table is described further below with reference to FIGS. 5A-B. Similarly, a single camera and light platform could also be positioned by an "X/Y/angle" platform to capture all views of face and sides.

Figure 5A:
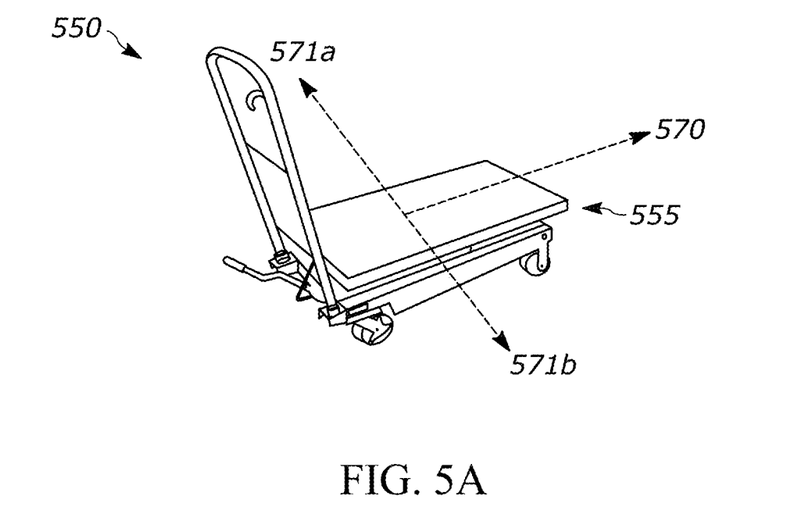
FIGS. 5A-B are perspective views of a mobile platform and positioning system in accordance with an alternative embodiment.
Figure 5B:
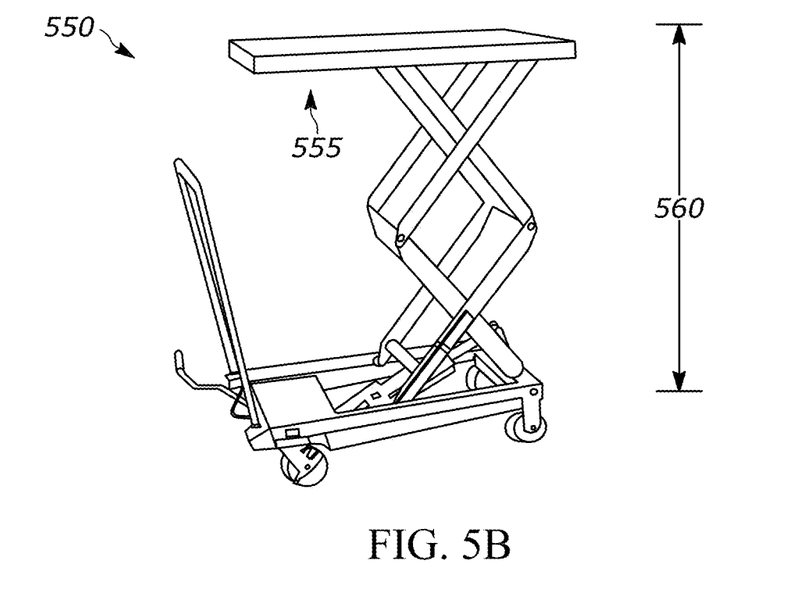

FIGS. 5A-B are perspective views of a mobile platform 550 and positioning system 560 in accordance with an alternative embodiment. In the context of the present example, the mobile platform 550 is in the form of a mobile lift table having a base 555 that can be moved between a lower position as shown in FIG. 5A to an upper position as shown in FIG. 5B. According to one embodiment, compute and power functionality (e.g., compute and power functionality 335) as well as a single camera and lighting array (e.g., camera and lighting array 410) may be coupled directly or indirectly to the surface of the base 560 and may be manually or automatically positioned vertically with the use of a lift table as the vertical positioning system. The mobile lift table embodiment depicted in FIG. 5A-B is simply intended to illustrate the numerous types of positioning systems. Other examples of mechanical components that may be used to linearly move a camera and lighting array vertically or horizontally include manual screw jacks, a single or dual-rail linear motion track, electrical linear actuators, a rack and pinion linear slide, a screw or chain drive, a drive belt, hydraulic jacks and/or cylinders, pneumatic actuators, a scissor lift table, and servo motors.

Figure 6:
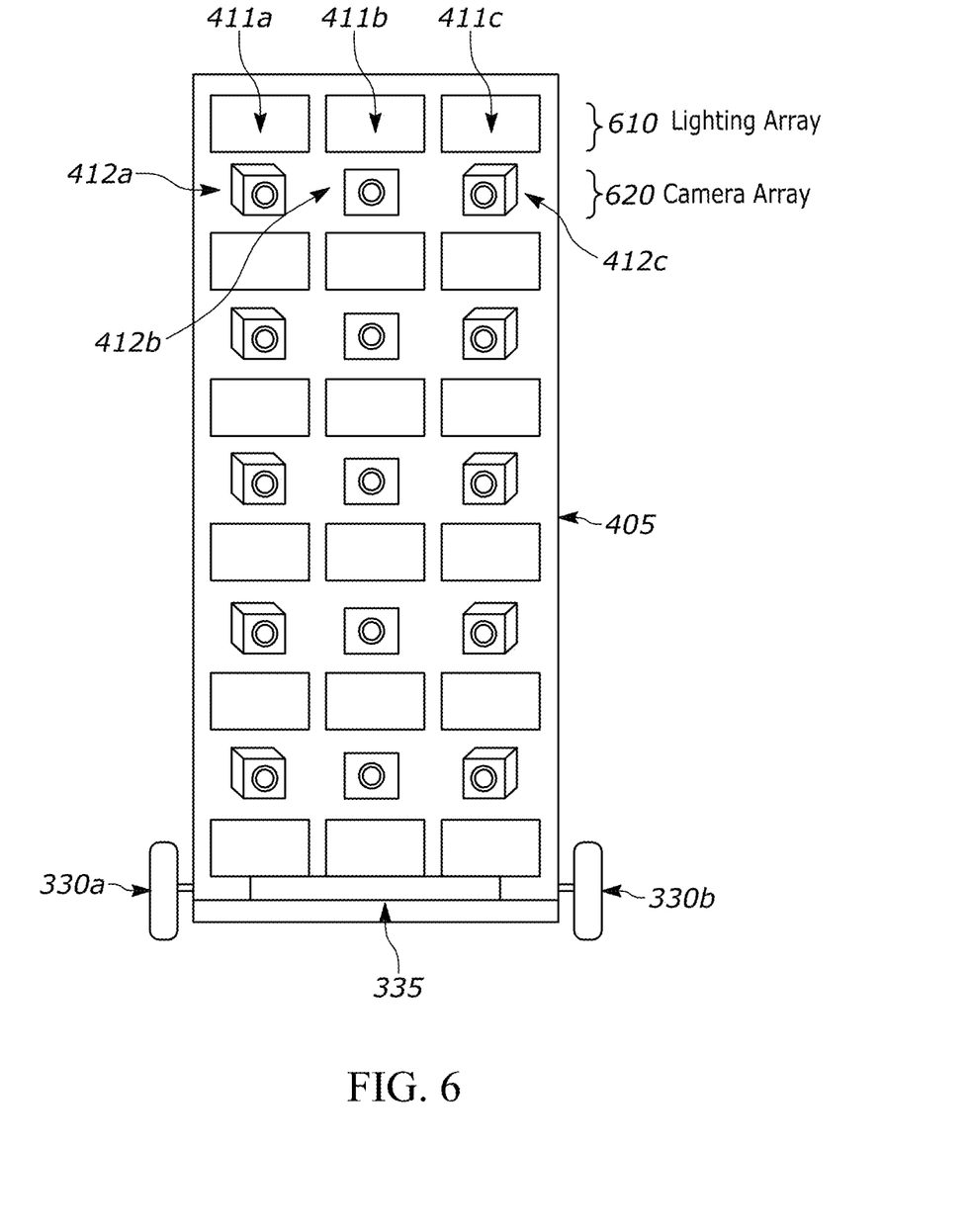
FIG. 6 is a front view of a rack imaging system in accordance with an alternative embodiment.

FIG. 6 is a front view of a rack imaging system 600 in accordance with an alternative embodiment. In the context of the present example, the rack imaging system 600 includes multiple rows of lighting arrays 610 and camera arrays 620 in a number sufficient to provide coverage of an entire face of the largest size rack from top to bottom. In such an embodiment, based on configuration settings, including information regarding the size of the rack (e.g., 4 U, 8 U, 12 U, 16 U, 32 U, 42 U, 48 U, and 50 U) to be imaged, an appropriate subset of the rows of the lighting arrays 610 and the camera arrays 620 may be enabled to capture images sufficient to capture the entire face (or portion) of the rack at issue.

As noted above, while the example camera array 620 shown in the context of the present example includes three cameras 412a-c, more or fewer equally-spaced cameras could be employed depending upon goals of a particular implementation and the horizontal field of view of the cameras at issue. Similarly, while in the context of the present example, five camera arrays 620 are shown, depending upon the vertical field of view of the cameras at issue, the goals of the particular implementation, and the rack sizes of the rack faces to be imaged, more or fewer camera arrays 620 may be employed. Furthermore, more or fewer lighting elements may be included within each lighting array 610 and more or fewer lighting arrays 610 may be employed.

Figure 7:
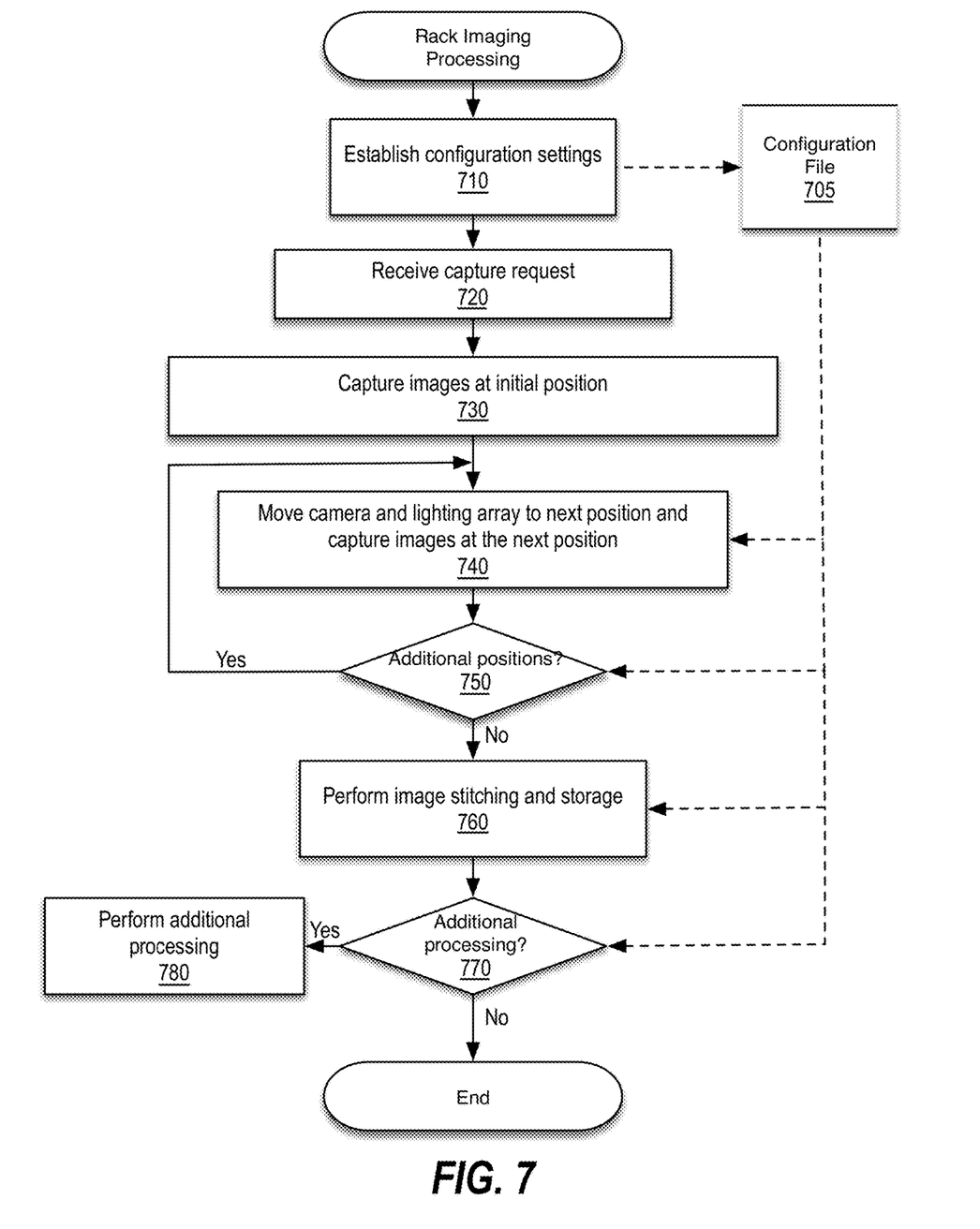
FIG. 7 is a flow diagram illustrating rack imaging processing in accordance with an embodiment.

FIG. 7 is a flow diagram illustrating rack imaging processing in accordance with an embodiment. The processing described with reference to FIG. 7 may be implemented in the form of executable instructions stored on a machine readable medium and executed by a processing resource (e.g., a microcontroller, a microprocessor, central processing unit core(s), an ASIC, an FPGA, and the like) and/or in the form of other types of electronic circuitry. For example, this processing may be performed by one or more computer systems of various forms, such as the compute functionality 335 described with reference to FIG. 3 and/or the computer systems described with reference to FIG. 8 below. While for sake of brevity, this flow diagram and the below description focus on automated processing, those skilled in the art will appreciate that various aspects of the processing (e.g., moving of the camera and lighting arrays) described herein may be performed manually via mechanical means. Also, prior to initiation of the imaging at block 720, it is assumed that the rack imaging system is in position for capturing images of the rack to be imaged. For example, it is assumed the end user has wheeled the rack imaging system to the rack to be imaged, positioned and oriented the moving platform appropriately with respect to the face of the rack to be imaged, for example, using a focus/alignment mechanism (e.g., folding focus/alignment rod 320, and stabilized the moving platform, for example, by deploying a brace (e.g., folding brace 325) and/or locking the wheels.

At block 710, configuration settings for an imaging run are established. As those skilled in the art will appreciate, there are numerous ways to establish and store configuration settings for a system. For example, the rack imaging system may read a local configuration file stored in a file system or a remote configuration file on a network file system accessible via a network connection (physical or wireless). There are also a variety of ways to interact with computer systems, including through an integrated or wirelessly coupled display and/or remotely via a graphical user interface or command line interface. In one embodiment, the compute functionality of the rack imaging system may include a web server that provides a web browser-based interface through which appropriate configuration settings can be selected and stored prior to performing imaging of one of more faces of a rack. Non-limiting examples of configuration settings include:

The customer name;
The project name;

Order number or other unique identifying number and/or string;

Information identifying the rack and/or face(s) being imaged (for example, the image naming conventions may incorporate a rack name (potentially acquired from a hand-held bar code scanner or bar-code recognition within the imaging) and real-time clock information);

The size of the rack to be imaged (e.g., 4 U, 8 U, 12 U, 16 U, 32 U, 42 U, 48 U, or 50 U) and/or a certain "U" range subset to be scanned (for example, create an image of U10-22);

The location (e.g., folder or directory) to which the resulting images are to be stored;

Camera settings (e.g., depth of field, exposure, shutter speed, aperture, sensitivity, etc.);

Lighting element settings (e.g., brightness);

Positioning speed;

Offset distance;

The image file format (e.g., Joint Photographic Experts Group (JPEG), Portable Document Format (PDF), Tagged Image File Format (TIFF), bitmap or bitmap image file (BMP), Portable Graymap (PGM), Flexible Image Transport System (FITS), Portable Network Graphics (PNG), Graphic Interchange Format (GIF), raw image files, etc.), size (e.g., 1 to 14 Megapixel) and/or resolution (e.g., 72, 96, 200, 300 or 600 pixels per inch (PPI)) of the captured images, intermediate stored images and/or final stored image(s);

Whether compression is to be applied to the final images and if so, the type of compression;

Whether the final images are to be password protected and if so, the password;

Whether video imaging is to be enabled or disabled;

Email addresses to which the resulting images and/or notifications regarding their availability are to be sent;

Depending upon the particular implementation, multiple users may have different roles (e.g., administrator or imaging user) within the rack imaging system. For example, for purposes of allowing a less skilled user to perform one-touch imaging of a rack face, a more skilled user (e.g., a rack imaging system administrator) may establish the configuration settings. In alternative embodiments, the same user may perform both configuration and imaging. In any event, once configuration settings have been established, they may be saved to a configuration file 605 for use by the rack imaging system. Additionally, in some embodiments, Exchangeable Image File Format (EXIF) image tagging may be used to provide configuration information within the image file itself.

At block 720, a capture request is received. For example, responsive to the end user pressing a capture button (e.g., capture button 310), a signal may be received by the compute functionality of the rack imaging system to initiate an image capture sequence. Alternatively, the image capture sequence may be initiated via a smartphone app, via a browser-based interface or a graphical user interface of an integrated display of the rack imaging system.

At block 730, a set of images are captured by each of the cameras at the initial position. This step may include the compute functionality of the rack imaging system activating the lighting elements of a camera and lighting array (e.g., camera and lighting array 410) and causing each of the cameras 412a-c of the camera and lighting array to capture an image. These images may then be stored to a storage location specified by the configuration file 605.

At block 740, the camera and lighting array is moved to the next position and another set of images are captured. Depending upon whether the camera and lighting array represents a vertical or a horizontal camera and lighting array, the camera and lighting array is moved horizontally or vertically by a positioning system (e.g., positioning system 420 or 560). According to one embodiment, in which the rack imaging system is configured for use with multiple rack sizes, based on the size of the rack as indicated by the configuration file 605, a number of intermediate positions between the initial position and the ending portion may be determined by the compute functionality. Alternatively, the rack imaging system may be designed specifically for a particular rack size and the positions may be predetermined.

At decision block 750, it is determined whether there are additional positions to which the camera and lighting array is to be moved. If so, then processing loops back to block 740; otherwise, image capturing is complete and processing branches to block 760.

At block 760, the captured images are stitched together and stored. In one embodiment, the images captured at blocks 730 and 740 are combined to form a single image of the rack face in a predetermined or configurable image format, size and/or resolution. In one embodiment, the stitching image processing can take advantage of known positioning and lighting to provide high quality tiled images using commercially available and/or open source imaging processing packages (e.g., ImageJ/Fiji Is Just ImageJ (Fiji)). In alternative embodiments, both the captured images and the final stitched image are stored or no stitching may be performed and the captured images represent the final results.

At decision block 770, it is determined if additional processing is to be performed. In one embodiment, the additional processing (e.g., automatically generating and/or sending one or more email messages notifying one or more people regarding the availability of and/or containing the captured and/or final images; adding a record or records containing the captured and/or final images to a data structure or database; automatically generating a report or other documentation; additional image processing; etc.) may be specified in the configuration file 605. If additional processing is to be performed, rack imaging processing continues with block 780; otherwise, rack imaging processing is complete.

At block 780, the additional processing is performed. In one embodiment, the additional processing may be additional image processing that is to be performed on the final stitched image. In one embodiment, an "overview image" (e.g., a low resolution quick scan) of the entire face may be used to identify objects within the view (e.g., bar codes, equipment recognition, cable routing) and/or compare to an expected or exemplary image. For example, as part of a virtual audit process, the final stitched image or the overview image may be compared to a known good example of what the rack face at issue should look like or an average of other rack face images associated with the particular project. In an embodiment in which a display device is integrated with or otherwise connectable to the rack imaging system, real-time feedback may be provided to the end user regarding the rack face image, for example, highlighting differences between the rack face image and the known good example or the average rack face image for the project at issue. Alternatively, another form of output might be an "exception report" indicating that this image deviates from the expected image result. In some embodiments, the additional processing may involve creation of a "pivot view" showing the side wall image integrated with face image (e.g., via a pan-able display).

In alternative embodiments, a "preview image" function may be provided. For example, a "quick scan" at a lower resolution may provide a visual confirmation that the imaging system is properly aligned and configured for the image scan.

In some embodiments, various lighting optimizations may be performed prior to or during the image capture process, including adaptive lighting, adjusting camera sensitivity and/or making aperture adjustments.

In some embodiments, various multi-image capture improvements may also be performed, including the creation of high dynamic range images by capturing and then combining several different, narrower range, exposures of the same region of the face of the rack and/or by performing digital image processing techniques like focus stacking to combine multiple images taken at different focus distances to give a resulting image with a greater depth of field than any of the individual source images.

Non-limiting examples of potential use cases/scenarios include equipment build documentation, engineering communication, customer communications and virtual audit.

With respect to equipment build documentation, effective documentation of as build customer orders can be used to facilitate consistent product implementation and appearance. Additionally, methods documents build with optimal images can be used to reduce confusion and re-work in the rack build process. Furthermore, process simplification provide by the rack imaging system is thought to significantly reduce labor time for the documentation steps.

In relation to engineering communication, the rack imaging system is expected to enhance communications between factory floor and engineering functions, especially when members of the teams are located in different geographical areas.

Turning to customer communications, the ability to share professional rack build images with the customer is expected to reduce the need for rework and mitigation efforts. Additionally, the rack imaging system is expected to facilitate the use of professional quality customer deliverable imaging as build documentation. For example, imaging can be performed at each of several steps during the build (e.g., "bare metal," power wiring complete, network wiring complete, etc.). Furthermore, the images captured and/or generated by the rack imaging system can be part of a value added deliverable that includes build process, location, serial number data and the like.

With respect to virtual audit, the use of the rack imaging system in partner factories may enable virtual auditing of customer intent and developer process compliance, which may reduce the need for auditor travel and/or on-site personnel.

While in the context of various embodiments described herein, various processing is described as being performed by compute functionality that is part of a rack imaging system, those skilled in the art will appreciate some of the processing (e.g., various of the image processing) may be offloaded by the rack imaging system to and performed by local on-premise computing systems to which the rack imaging system is in communication with via a network or cloud processing resources (e.g., available via a public, private or hybrid cloud).

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 8:
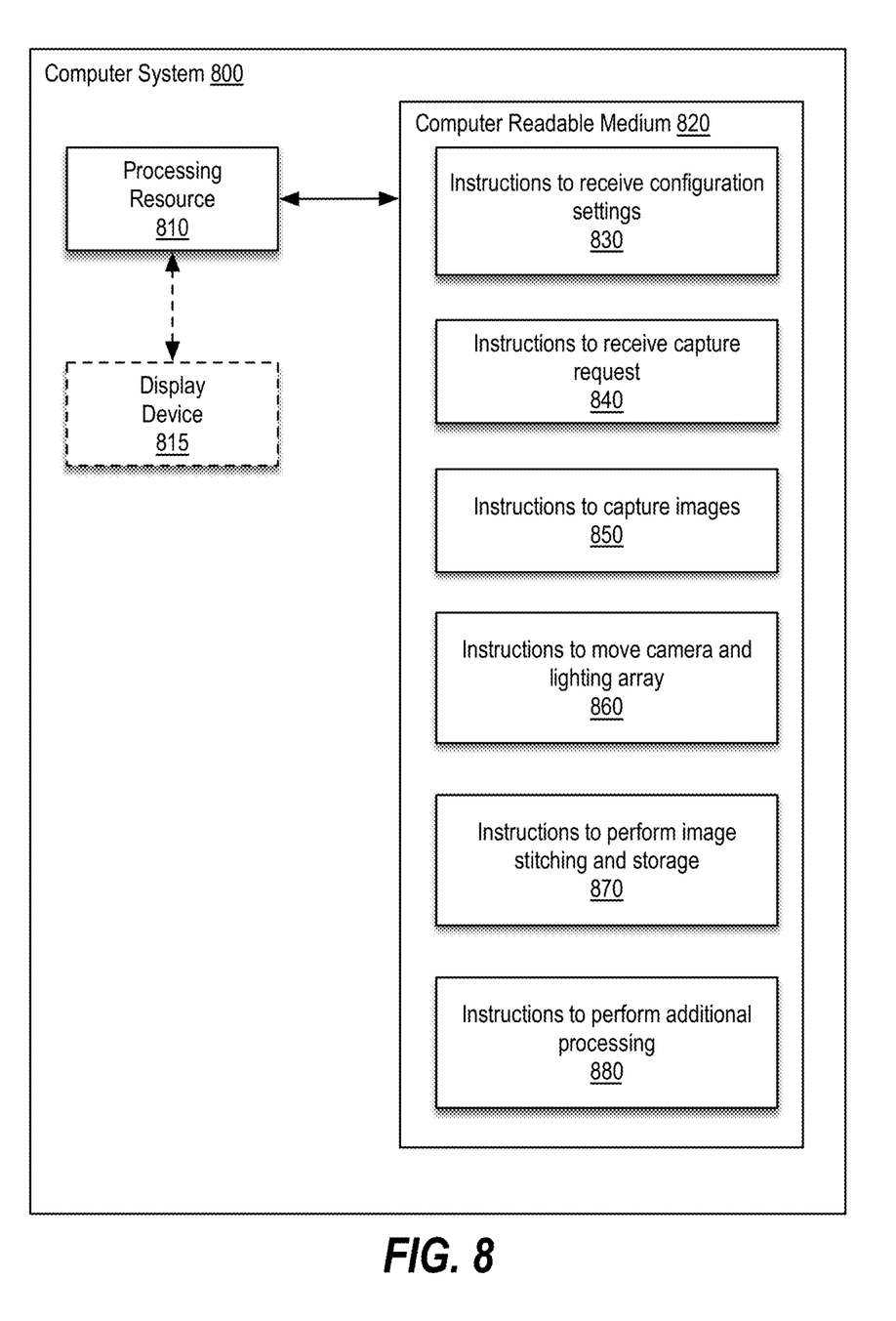
FIG. 8 is a block diagram of a computer system in accordance with an embodiment.

FIG. 8 is a block diagram of a computer system in accordance with an embodiment. In the example illustrated by FIG. 8, computer system 800 includes a processing resource 810 coupled to a non-transitory, machine readable medium 820 encoded with instructions to perform rack imaging processing. In one embodiment, the processing resource 810 is also coupled to a display device 815 to receive input from and/or provide output to an end user. The processing resource 810 may include a microcontroller, a microprocessor, central processing unit core(s), an ASIC, an FPGA, and/or other hardware device suitable for retrieval and/or execution of instructions from the machine readable medium 820 to perform the functions related to various examples described herein. Additionally or alternatively, the processing resource 810 may include electronic circuitry for performing the functionality of the instructions described herein.

The machine readable medium 820 may be any medium suitable for storing executable instructions. Non-limiting examples of machine readable medium 820 include RAM, ROM, EEPROM, flash memory, a hard disk drive, an optical disc, or the like. The machine readable medium 820 may be disposed within the computer system 800, as shown in FIG. 8, in which case the executable instructions may be deemed "installed" or "embedded" on the computer system 800. Alternatively, the machine readable medium 820 may be a portable (e.g., external) storage medium, and may be part of an "installation package." The instructions stored on the machine readable medium 820 may be useful for implementing at least part of the methods described herein.

In the context of the present example, the machine readable medium 820 is encoded with a set of executable instructions 830-880. It should be understood that part or all of the executable instructions and/or electronic circuits included within one block may, in alternate implementations, be included in a different block shown in the figures or in a different block not shown.

Instructions 830, upon execution, cause the processing resource 810 to receive configuration settings. In one embodiment, instructions 830 may correspond generally to instructions for performing block 710 of FIG. 7.

Instructions 840, upon execution, cause the processing resource 810 to receive a capture request. In one embodiment, instructions 840 may correspond generally to instructions for performing block 720 of FIG. 7.

Instructions 850, upon execution, cause the processing resource 810 to capture images at a particular position/location of the camera and lighting array. In one embodiment, instructions 840 may correspond generally to instructions for performing some or all of blocks 730 and 740 of FIG. 7.

Instructions 860, upon execution, cause the processing resource 810 to move a camera and lighting array. In one embodiment, instructions 860 may correspond generally to instructions for performing some or all of blocks 740 and 750 of FIG. 7.

Instructions 870, upon execution, cause the processing resource 810 to perform image stitching and storage. In one embodiment, instructions 870 may correspond generally to instructions for performing block 760 of FIG. 7.

Instructions 880, upon execution, cause the processing resource 810 to perform additional processing. In one embodiment, instructions 880 may correspond generally to instructions for performing blocks 770 and 780 of FIG. 7.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A system for imaging a rack in which information technology equipment is mounted, the system comprising:
   a camera and lighting array including a plurality of cameras located in a first plane orthogonal to a second plane and each having a first field of view in a first axis of the second plane located at a particular offset from a face of the rack, wherein, collectively, the first fields of view extend from one end of the face to another end of the face;
   a positioning system coupled to the camera and lighting array and operable to linearly move the camera and lighting array from a starting point to an ending point via a plurality of intermediate points along an axis in a third plane parallel to the first plane, wherein a position and orientation of the system is maintained with respect to the face of the rack during movement of the camera and lighting array by the positioning system from the starting point to the ending point;
   an extendable alignment guide or ultra-sonic focus measurement device to facilitate accurate and repeatable visual documentation of the face of the rack for each of a plurality of steps of a build process by aiding consistent (i) alignment of the system with respect to the face of the rack and (ii) positioning of the system to place the camera and lighting array at the particular offset from the face of the rack;
   a computer system to (i) cause the plurality of cameras to capture images at the starting point, at each of the plurality of intermediate points and at the ending point; (ii) stitch the images together to form a single image of the face of the rack in a predetermined format; and (iii) store the single image; and
   a wheeled platform providing a stable base for the positioning system and the computer system and facilitating mobility of the system.

2. The system of claim 1, wherein the first fields of view of neighboring cameras of the plurality of cameras overlap.

3. The system of claim 1, wherein the camera and lighting array includes a plurality of light-emitting diode (LED) photo-lighting panels.

4. The system of claim 1, wherein the plurality of cameras consists of three cameras.

5. The system of claim 4, wherein:
   a first camera of the three cameras is oriented for an angular view of a left portion of the face of the rack and any equipment along a left interior wall of the rack; and
   a second camera of the three cameras is oriented for an angular view of a right portion of the face of the rack and any equipment along a right interior wall of the rack.

6. The system of claim 4, wherein the positioning system moves the camera and lighting array vertically along the axis.

7. The system of claim 6, wherein movement of the camera and lighting array is performed manually by a user of the system via the positioning system and wherein the positioning system includes detents or other guidance to denote the plurality of intermediate points.

8. The system of claim 6, wherein movement of the camera and lighting array is performed automatically by the positioning system.

9. The system of claim 1, wherein the positioning system moves the camera and lighting array horizontally along the axis.

10. The system of claim 1, wherein the computer system is further operable to provide feedback regarding the single image based on a comparison of the single image to (i) a known good example of how the face of the rack should appear or (ii) to an average rack face image for a project at issue.

11. The system of claim 1, wherein the plurality of cameras include:
    a first camera located right of center with respect to a midline of the camera and lighting array and oriented for an angular view of a left portion of the face of the rack including one or more of cables, power equipment, rack management modules, networking equipment, and cooling infrastructure mounted to a left interior wall of the rack; and
    a second camera located left of center with respect to the midline of the camera and lighting array and oriented for an angular view of a right portion of the face of the rack including one or more of cables, power equipment, rack management modules, networking equipment, and cooling infrastructure mounted to a right interior wall of the rack.

12. The system of claim 1, wherein the plurality of steps include bare metal, completion of power wiring, or completion of network wiring.

* * * * *